(12) United States Patent
Sharpe et al.

(10) Patent No.: US 11,820,247 B2
(45) Date of Patent: Nov. 21, 2023

(54) MULTI-INPUT MULTI-OUTPUT RENEWABLE ENERGY SYSTEMS

(71) Applicant: BLOOM ENERGY CORPORATION, San Jose, CA (US)

(72) Inventors: Barry Sharpe, Kennett Square, PA (US); Brian Hadley, San Jose, CA (US); Charles Frederick Walton, Springfield, PA (US)

(73) Assignee: Bloom Energy Corporation, San Jose, CA (US)

( * ) Notice: Subject to any disclaimer, the term of this patent is extended or adjusted under 35 U.S.C. 154(b) by 0 days.

(21) Appl. No.: 18/050,189

(22) Filed: Oct. 27, 2022

(65) Prior Publication Data
US 2023/0133079 A1    May 4, 2023

Related U.S. Application Data

(60) Provisional application No. 63/275,435, filed on Nov. 3, 2021.

(51) Int. Cl.
*H02J 7/00*    (2006.01)
*B60L 53/54*    (2019.01)
(Continued)

(52) U.S. Cl.
CPC .............. *B60L 53/54* (2019.02); *B60L 50/75* (2019.02); *B60L 58/30* (2019.02); *B60L 58/40* (2019.02);
(Continued)

(58) Field of Classification Search
None
See application file for complete search history.

(56) References Cited

U.S. PATENT DOCUMENTS 7,233,079 B1 * 6/2007 Cooper .................. H02J 3/381
                                                            290/55
7,622,897 B2    11/2009 Eberhard et al.
(Continued)

FOREIGN PATENT DOCUMENTS

CN          105518924 B      9/2018
EP            3937283 A1     1/2022
(Continued)

OTHER PUBLICATIONS

Rashmi G. Kale, Ashish A. Nilangekar, Implementation of multiple input and multiple output boost converter for electric vehicle charging system, International Conference on Nascent Technologies in the Engineering Field, Jan. 28, 2017, Vashi, India.
(Continued)

*Primary Examiner* — Arun C Williams
(74) *Attorney, Agent, or Firm* — Kanika Radhakrishnan; Evergreen Valley Law Group

(57) ABSTRACT

Various embodiments of the present disclosure provide a multi-input multi-output energy charging system to generate hydrogen, provide baseload energy to a facility, and provide electrical power to charge electric vehicles (EV). In an embodiment, a charging system includes a solid oxide fuel cell (SOFC) system that generates electricity from one or more fuel inputs. One or more fuel inputs are renewable fuels. The charging system further includes a solid oxide electrolyzer cell (SOEC) system coupled to the SOFC system. The SOEC system generates hydrogen from the electricity received from the SOFC system and water input. The SOFC system facilitates the charging of an electric vehicle, storing charge in a battery, and providing electric power to a load from the generated electricity. The SOEC system facilitates refueling a hydrogen fuel cell vehicle from
(Continued)

the generated hydrogen and storing the generated hydrogen in a hydrogen storage vessel.

12 Claims, 6 Drawing Sheets

(51) Int. Cl.
    *B60L 58/40*     (2019.01)
    *B60L 58/30*     (2019.01)
    *B60L 50/75*     (2019.01)
    *H02J 3/38*     (2006.01)
    *H01M 8/0656*     (2016.01)
    *C25B 1/04*     (2021.01)

(52) U.S. Cl.
    CPC .............. *C25B 1/04* (2013.01); *H01M 8/0656* (2013.01); *H02J 3/381* (2013.01); *H01M 2250/20* (2013.01); *H02J 2300/30* (2020.01)

(56) References Cited

U.S. PATENT DOCUMENTS

| | | |
|---|---|---|
| 2005/0106429 A1 | 5/2005 | Keefer |
| 2006/0068248 A1 | 3/2006 | Ruhi |
| 2006/0208571 A1 | 9/2006 | Fairlie |
| 2006/0222912 A1 | 10/2006 | Smith |
| 2008/0318092 A1 | 12/2008 | Sridhar et al. |
| 2020/0361323 A1 | 11/2020 | Chon et al. |
| 2021/0119231 A1 | 4/2021 | Nakamuta et al. |
| 2022/0136119 A1* | 5/2022 | Flanders ............... C07C 1/0485 435/71.1 |

FOREIGN PATENT DOCUMENTS

| | | |
|---|---|---|
| KR | 20170080824 A | 7/2017 |
| WO | 2020163584 A1 | 8/2020 |

OTHER PUBLICATIONS

S. Pradeep Kumar, R. Krishnakumar, E.N. Ganesh, Multi-input multi-output converter with battery charger for low power applications, International Journal of Engineering & Technology, May 2018, Chennai, India.

* cited by examiner

MULTI-INPUT MULTI-OUTPUT RENEWABLE ENERGY SYSTEMS

TECHNICAL FIELD

The present disclosure relates generally to renewable energy systems and, more particularly to, systems that utilize multiple zero-carbon sources of energy to generate hydrogen, provide baseload energy to a facility, and provide electrical power to charge electric vehicles (EV).

BACKGROUND

Currently, electrical and hydrogen vehicle charging and refueling infrastructure is sparse and at times unreliable. Such infrastructure is a key limitation to the adoption of zero-emission transportation.

Currently existing hydrogen vehicle charging stations are refilled by trucking in compressed hydrogen, due to which these stations are frequently empty or shut down due to transportation or mechanical issues. Compressed hydrogen is not as widely available as gasoline or diesel fuel, and requires extensive technical expertise to transfer between places and dispense into hydrogen vehicles. Transporting hydrogen to refilling stations is quite less reliable than gasoline. Moreover, the majority of compressed hydrogen is currently generated using natural gas without carbon-free sources. Hence, owners of zero-carbon vehicles are forced to use fuels produced with carbon-based methods that defeat the primary purpose of the adoption of green energy vehicles.

Further, most of the present-day EV chargers take AC power from an external grid and convert the AC power into DC power for charging the EV. The AC power from the external grid is not reliable and is prone to power shortages and high surcharges. Further, demand charges are levied for higher consumption of AC power from the external grid. To offset the demand charges, present EV charging service providers are installing battery systems that allow them to rapidly charge the EV and slow charge the battery. The AC power from the external grid has high carbon footprints, which does not provide a cleaner solution than the usual hydrocarbon-fueled vehicles.

Based on the foregoing, there exists a need for a combined cleaner energy solution for charging an electric vehicle and refueling a hydrogen fuel cell vehicle that has zero or extremely low carbon emission, in addition to providing other technical benefits.

SUMMARY

Various embodiments of the present disclosure provide a multi-input multi-output (MIMO) energy charging system to generate hydrogen, provide baseload energy to a facility, and provide electrical power to charge electric vehicles (EV), among other benefits.

To achieve one or more of the above-mentioned objectives, a charging system is disclosed, in an embodiment of the present disclosure. The charging system includes a solid oxide fuel cell (SOFC) system configured to generate electricity from one or more fuel inputs, where one or more fuel inputs are renewable fuels. The charging system further includes a solid oxide electrolyzer cell (SOEC) system that is coupled to the SOFC system. The SOEC system is configured to generate hydrogen from the electricity received from the SOFC system and water input. Further, the SOFC system is configured to facilitate at least one of: charging of an electric vehicle, storing charge in a battery, and providing electric power to a load from the generated electricity. The SOEC system is further configured to facilitate at least one of: refueling a hydrogen fuel cell vehicle from the generated hydrogen, and storing the generated hydrogen in a hydrogen storage vessel.

BRIEF DESCRIPTION OF THE FIGURES

The following detailed description of illustrative embodiments is better understood when read in conjunction with the appended drawings. To illustrate the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers.

Figure 1:
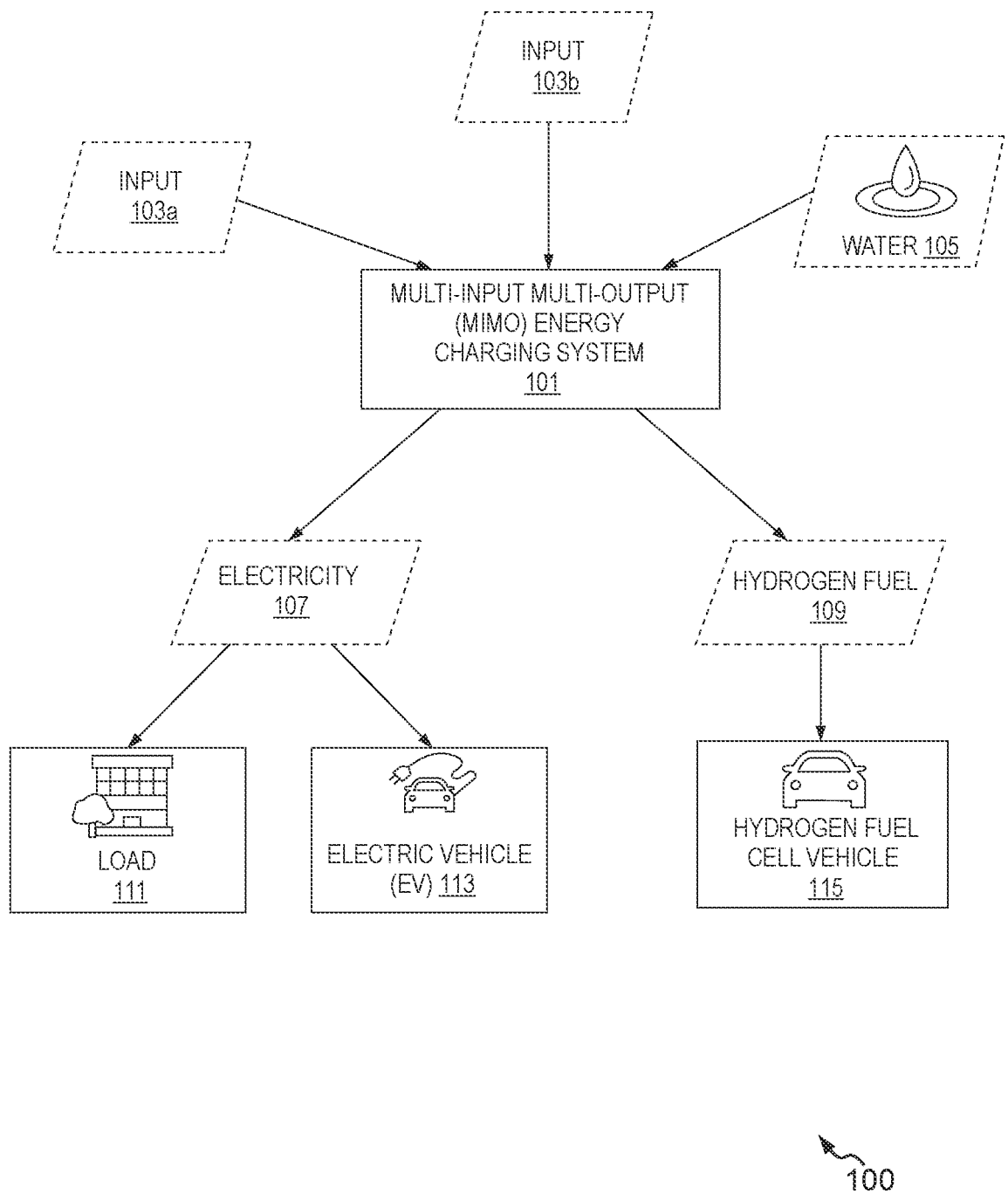
FIG. 1 illustrates an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The terms "direct current (DC) power", "electricity", "DC voltage", "DC" have been used interchangeably throughout the description, and they refer to the one-directional flow of electric charge. The voltage generated by solid oxide fuel cell systems and solar systems is direct current (DC) voltage unless mentioned otherwise.

The terms "alternating current (AC) power", "AC", have been used interchangeably throughout the description, and they refer to the bi-direction flow of electric charge. The power received from an external grid is AC power, and the power supplied to the grid is AC power unless mentioned otherwise.

Overview

Various embodiments of the present disclosure provide a multi-input multi-output energy charging system for achieving multiple objectives, for example, among other things, to generate hydrogen, provide baseload energy to a facility, and provide electrical power to charge electric vehicles (EV). In one embodiment, the MIMO energy charging system includes a solid oxide fuel cell (SOFC) system and a solid oxide electrolyzer cell (SOEC). The SOFC system charges an electric vehicle (EV) with direct current (DC) power produced from fuel cells included in the SOFC system. In addition to charging the EV, the DC power produced from the SOFC system can be provided to an external grid or a facility upon conversion of DC voltage to alternating current (AC) voltage. The SOFC system generates the DC power by oxidizing fuels having zero or near-zero carbon footprints, such as liquefied natural gas (LNG), Bio-methane, and directed biogas, hydrogen, or a combination of these fuels. The DC power is produced from the SOFC system. Water and DC power are inputted into the SOEC system to produce hydrogen. The hydrogen produced from the SOEC system can be stored and later used to refuel hydrogen fuel cell vehicles (HFCV). The DC power inputted to the SOEC system can also be provided from renewable and non-renewable power sources such as an external grid, solar power systems, wind power systems, hydropower systems, or any other zero-carbon power generation systems. The power received from the external grid is AC and needs to be converted to DC to provide the DC power to the SOEC system. The zero-carbon power generation systems are the systems that generate electric power without emitting carbon into the earth's atmosphere or without having an adverse environmental impact.

The MIMO energy charging system can be adapted to have multiple configurations to provide an energy solution. At least one input from a natural gas pipeline, LNG, bio-methane, excess hydrogen, solar energy, wind energy, or any other form of electricity can be used to set up the MIMO energy charging station to offer one or more objectives such as providing baseload power to an external grid or a facility, EV charging, and hydrogen generation for refueling hydrogen vehicles.

Although process steps, method steps, or the like in the disclosure may be described in sequential order, such processes and methods may be configured to work in alternate orders. In other words, any sequence or order of steps that may be described in this patent application does not, in and of itself, indicate a requirement that the steps need to be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention (s), and does not imply that the illustrated process is preferred.

Various embodiments of renewable energy-based MIMO systems for providing baseload power to an external grid or a facility, EV charging, and/or hydrogen generation are further described with references to FIG. 1 to FIG. 4.

FIG. 1 is an example representation of an environment 100 related to at least some example embodiment of the present disclosure. The environment 100 depicts a multi-input multi-output (MIMO) energy charging system 101 that receives inputs 103a and 103b and water 105. The environment 100 further depicts an electricity output 107 and a hydrogen output 109 provided from the MIMO energy charging system 101. Further, the environment 100 depicts an exemplary load 111, an electric vehicle (EV) 113, and a hydrogen fuel cell vehicle (HFCV) 115.

The MIMO energy charging system 101 may include a combination of solid oxide fuel cell (SOFC) system and solid oxide electrolyzer cell (SOEC) system interconnected to each other. The MIMO energy charging system 101 produces electricity (DC power) and hydrogen using inputs 103a and 103b and the water input (see, water 105).

The inputs 103a and 103b to the MIMO energy charging station 101 can be at least one of fuel input and an electricity input, which are later discussed with reference to FIGS. 2A-2C. In the illustrated representation of FIG. 1, only two inputs 103a and 103b are shown for example purposes, however, more than two types of inputs can be provided to the MIMO energy charging system 101.

In the illustrated representation, the MIMO energy charging system 101 has two outputs as electricity output 107 (interchangeably referred to as 'DC power') and hydrogen output 109. The DC power 107 is converted into alternating current (AC) power to provide the AC power to the load 111. The DC power 107 is used to charge the EV 113. The hydrogen output 109 provides hydrogen to refuel the HFCV 115.

The load 111 can be an electrical grid, a building, a peripheral device of MIMO energy charging system 101 (e.g., a lighting device, blower, fan, etc.), or any other electric power-consuming device. If the load 111 is an AC load, the DC power from the MIMO energy charging system 101 can be provided to a DC/AC converter for conversion to AC power. If the load 111 is a DC load, the DC power from the MIMO energy charging system 101 can be provided directly from a DC/DC converter to the load 111.

The EV 113 can be a land-based vehicle such as a car, truck, bus, train, motorcycle, all-terrain vehicle, snowmobile, tractor, lawnmower, etc. The EV 113 may also be a hybrid vehicle with external charging capability. The EV 113 can operate, at least in part, by utilizing an electrical charge stored in a storage device such as one or more batteries. The batteries can be lead-acid batteries, nickel-cadmium batteries, nickel-metal hydride batteries, lithium-ion batteries, lithium-ion polymer batteries, zinc-air batteries, molten salt batteries, and/or any other existing or to be developed electric vehicle batteries. The EV 113 may include a flow battery or other liquid electrolyte battery.

The HFCV 115 is a fuel cell vehicle powered by hydrogen. The HFCV 115 is similar to an EV in that the HFCV 115 uses an electric motor instead of an internal combustion engine. The HFCV 115 generates its electricity onboard with hydrogen from its fuel tank and oxygen from atmospheric air. In one form, the fuel cells in the HFCV 115 have a ceramic oxide electrolyte separated by conductive interconnect plates. Other fuel cell types, such as PEM, molten carbonate, phosphoric acid, etc. may also be used. The most commonly used fuel cell type in commercial HFCVs is PEM.

Figure 2A:
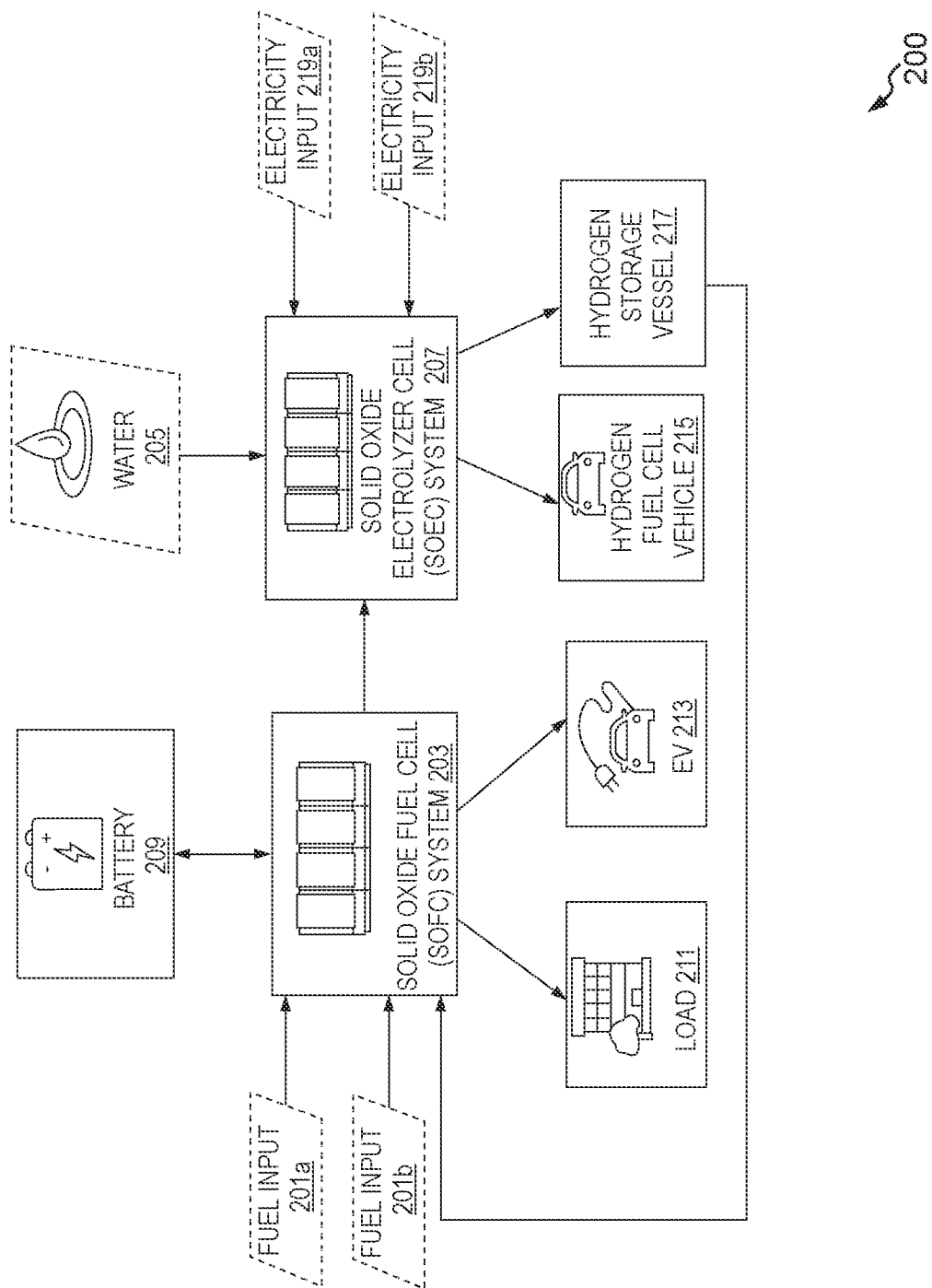
FIG. 2A is an example representation of the MIMO energy charging system in accordance with an embodiment of the present disclosure.

FIG. 2A is an example representation of a MIMO energy charging system 200, in accordance with an embodiment of the present disclosure. The MIMO energy charging system 200 is an example of the MIMO energy charging system 101. The MIMO energy charging system 200 includes a SOFC system 203, a SOEC system 207, a battery 209, and a hydrogen storage vessel 217. The MIMO energy charging system 200 has fuel inputs 201a and 201b, electricity inputs 219a and 219b, and a water input source (see, water 205). In one configuration, the SOFC system 203 is electrically coupled to the SOEC system 207 to provide electricity to the SOEC system 207 in addition to the electricity inputs 219a and 219b.

The fuel inputs 201a and 201b and the electricity inputs 219a and 219b are types of the inputs 103a and 103b shown in FIG. 1. The fuel inputs 201a and 201b can be zero or low carbon footprint-based fuels such as natural gas pipeline, LNG, bio-methane, or excess hydrogen produced by the SOEC system 207. In one configuration, the fuel inputs 201a and 201b can be blended in different proportions for providing to the SOFC system 203. The electricity inputs 219a and 219b can be clean electricity generated from solar energy, wind energy, or any other form of electricity generated from zero or low carbon footprint. In an example, the electricity inputs 219a and 219b can be electricity received from an external grid to which multiple renewable and non-renewable power sources are connected. Examples of non-renewable power sources include nuclear power sources and fossil fuel power sources using coal and oil, etc. The electricity received from the external grid is AC and needs to be converted to DC to be provided as the electricity inputs 219a and 219b to the SOEC system 207. FIG. 2A depicts only two fuel inputs 201a and 201b, and two electricity inputs 219a and 219b for the ease of representation, however, it should be noted that many types of fuel inputs and electricity inputs can be used in the MIMO energy charging system 200.

The SOFC system 203 may include a single fuel cell or a stack of fuel cells. The fuel cell has a ceramic oxide electrolyte separated by conductive interconnect plates. Other fuel cell types, such as PEM, molten carbonate, phosphoric acid, etc. may also be used. The one or more fuel cells are electrically connected in series and separated by electrically conductive interconnects, such as gas separator plates which function as interconnects. The SOFC system 203 is configured to generate electricity (DC power) by oxidizing fuel received in form of the fuel inputs 201a and 201b, where the fuel inputs may include, but are not limited to, LNG, bio-methane directed biogas, or hydrogen. The SOFC system 203 may facilitate charging the EV 213 from the generated DC power. The DC power can be stored in the battery 209 or can be provided to the load 211 in the absence of the EV 213. The DC power can also be provided to the SOEC system 207 to produce hydrogen when needed. The SOFC system 203 is electrically connected to the load 211 using a control unit (not shown). Various components of the SOFC system 203 are explained in detail later in FIG. 3.

The SOEC system 207 may include a single electrolyzer cell or a stack of electrolyzer cells. The electrolyzer cells are electrochemical devices that produce hydrogen from the electrolysis of water by using water 205 and electricity from either the electricity inputs 219a or 219b or electricity received from the SOFC system 203. Since hydrogen is produced onsite i.e. at the remote MIMO energy charging station, there is no need to transport hydrogen that would otherwise require complex infrastructure in existing systems. In an embodiment, the SOEC system 207 may further include the hydrogen storage vessel 217 to store the produced hydrogen. In another embodiment, the hydrogen storage vessel 217 can be outside the SOEC system 207 as shown in FIG. 2A. The SOEC system 207 may facilitate refueling of the HFCV 215 with the produced hydrogen. The SOEC system 207 may further include the hydrogen dispenser to refill the tank of the HFCV 215 using the hydrogen stored in hydrogen storage vessel 217 or using the hydrogen produced by the SOEC system 207. The hydrogen stored in the hydrogen storage vessel 217 can be used as fuel for the SOFC system 203 in addition to the fuel inputs 201a, 201b.

The battery 209 can be any charge storage device to store the additional DC power generated by the SOFC system 203.

The hydrogen storage vessel 217 stores hydrogen. The hydrogen storage vessel 217 is mechanically coupled to the SOFC system 203 to provide hydrogen as fuel in absence of the fuel inputs 201a and 201b. The hydrogen storage vessel 217 may include an adsorbent material that can adsorb hydrogen gas. Examples of such adsorbent material include metal hydrides, carbon nanotubes, and high surface area carbon powder, etc.

Figure 2B:
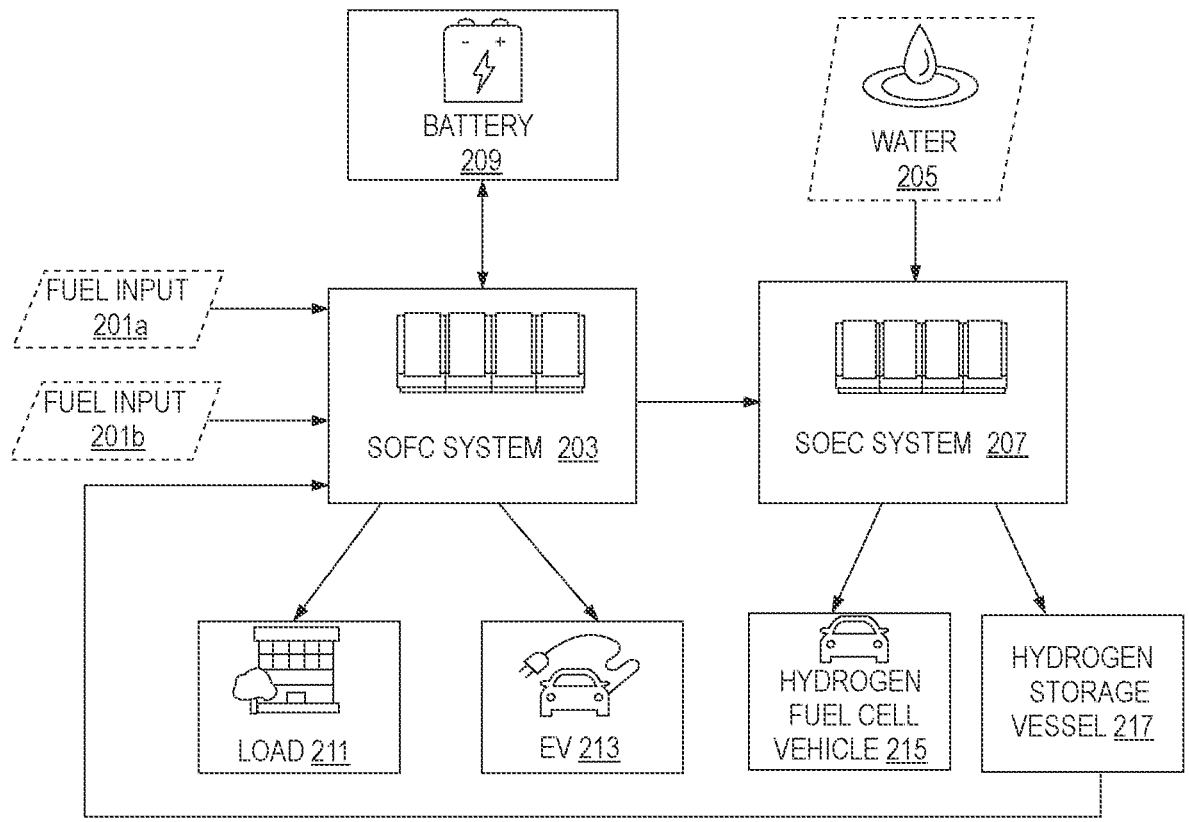
FIG. 2B is another example representation of the MIMO energy charging system in accordance with another embodiment of the present disclosure.

FIG. 2B is an example representation of the MIMO energy charging system 225, in accordance with another embodiment of the present disclosure. The MIMO energy charging system 225 is depicted to include the SOFC system 203, the SOEC system 207, the battery 209, and the hydrogen storage vessel 217. In this embodiment, the MIMO energy charging system 200 is only provided with fuel inputs 201a and 201b and water 205. The SOFC system 203 is coupled to the SOEC system 207 to provide electricity to the SOEC system 207.

The SOEC system 207 is configured to produce hydrogen by using the electricity provided by the SOFC system 203 or the battery 209, and water 205. Other components and working of the MIMO energy charging system 225 remain the same as that of the MIMO energy charging system 200, and hence the corresponding description is omitted for the sake of brevity.

Figure 2C:
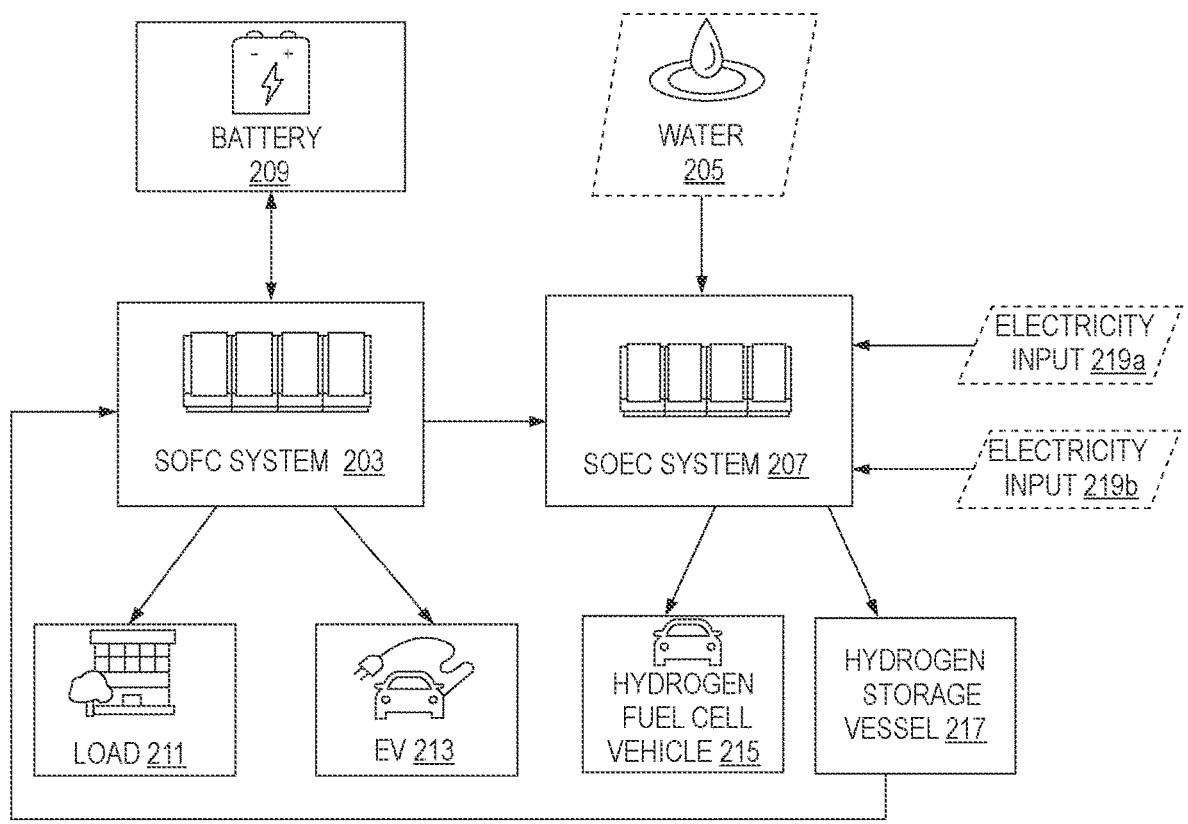
FIG. 2C is another example representation of the MIMO energy charging system in accordance with another embodiment of the present disclosure.

FIG. 2C is an example representation of the MIMO energy charging system 250, in accordance with another embodiment of the present disclosure. The MIMO energy charging system 250 is depicted to include the SOFC system 203, the SOEC system 207, the battery 209, and the hydrogen storage vessel 217. In this embodiment, the MIMO energy charging system 200 is only provided with electricity inputs 219a and 219b and water 205. The SOEC system 207 is coupled to the SOFC system 203 via the hydrogen storage vessel 217 to provide hydrogen to the SOFC system 203.

The SOEC system 207 is configured to produce hydrogen by using the electricity provided by the electricity inputs 219a and 219b initially. After the generation and storage of the hydrogen by the SOEC system 207, the SOFC system 203 is provided with the hydrogen from the hydrogen storage vessel 217. The SOFC system 203 is configured to use hydrogen as fuel in the absence of the fuel inputs 201a and 201b to produce DC power. Other components and working of the MIMO energy charging system 250 remain the same as that of the MIMO energy charging system 200, and hence the corresponding description is omitted for the sake of brevity.

Figure 3:
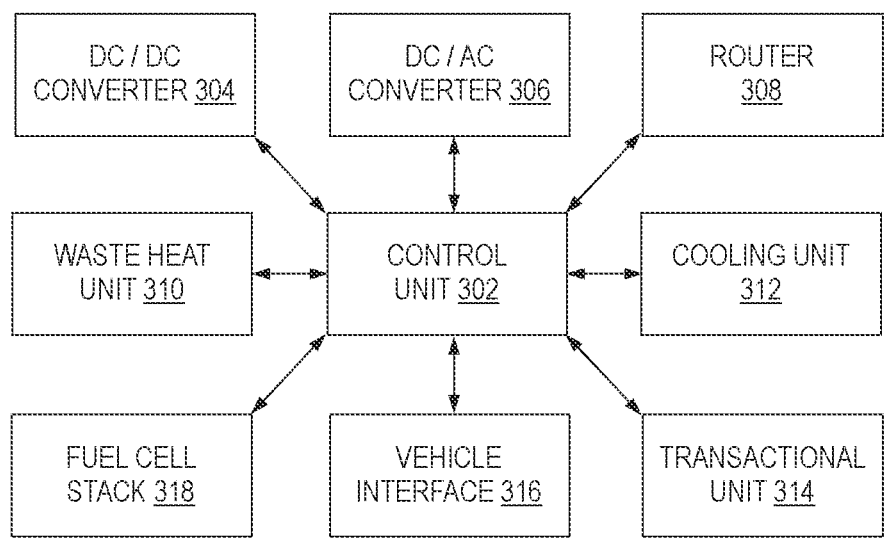
FIG. 3 is a block diagram of a solid oxide fuel cell (SOFC) system in accordance with an embodiment of the present disclosure.

FIG. 3 is a block diagram of a SOFC system 300, in accordance with an embodiment of the present disclosure. The SOFC system 300 is similar to the SOFC system 203 described with references to FIGS. 2A-2C.

The SOFC system 300 may include a fuel cell stack 318, a control unit 302, a DC/DC converter 304, a DC/AC converter 306, a router 308, a cooling unit 312, a waste heat unit 310, transactional unit 314, and a vehicle interface 316 to connect to a battery of an electric vehicle (EV) (for example, EV 213 in FIGS. 2A-2C). In some embodiments, the SOFC system 300 may include more or fewer components than those depicted herein.

The control unit 302 includes a switch and a controller device such as a computer (not shown in FIG. 3). The switch may be an electrical switch (e.g., a switching circuit) or an electromechanical switch, such as a relay. The controller device determines whether the DC power from the fuel cell stack 318 has to be routed to a load (such as load 211), a SOEC system (such as the SOEC system 207), or a power storage device (such as battery 209). In one form, the controller device is configured to determine whether at least one of the fuel inputs is connected to the SOFC system 300. In response to a determination that at least one of the fuel inputs (such as fuel inputs 201a and 201b) is connected, the fuel cell stack 318 is configured to generate DC power from fuel from at least one of the fuel inputs. In another form, the controller device is configured to blend the fuel inputs received from multiple fuel input sources (such as fuel inputs 201a and 201b). In other forms, in response to a determination that at least one of the fuel inputs is not available, the fuel cell stack 318 is configured to generate the DC power from hydrogen produced by the SOEC system. The controller device is configured to determine that the DC power from the fuel cell stack 318 is to be routed to the load when there is no electric vehicle for charging. Further, the controller device may determine that the DC power has to be stored in a battery upon the absence of a requirement from the load.

The DC/DC converter 304 is configured to produce variable DC power for different power ratings for charging batteries of different EVs. The DC/DC converter 304 is configured to increase or decrease a DC voltage generated by the fuel cell stack 318. The output of the DC/DC converter 304 can be adjustable to allow charging of a plurality of batteries with different voltage ratings. For example, a variable output voltage of 0-400V can be provided for charging an EV with the requirement of 400V and another EV with the requirement of 200V.

The DC/AC converter 306 is configured to convert the DC power from the fuel cell stack 318 to AC power. The DC/AC converter 306 is configured to provide the AC power to an AC load, such as an external grid or a building, etc. For example, the DC power from the fuel cell stack 318 is converted to AC power by the DC/AC converter 306 to provide the AC power to the load 211 as shown in FIGS. 2A-2C.

The router 308 is configured to route the DC power from the fuel cell stack 318 to different components in the SOFC system 300, upon receiving instructions from the control unit 302.

The transactional unit 314 may include a processor, memory, and a user interface. The transactional unit 314 is configured to control the waste heat unit 310 to heat the battery of the EV while charging, and the cooling unit 312 to cool the battery of the EV while charging.

The vehicle interface 316 receives the DC power from the DC/DC converter 304. The vehicle interface 316 can be any interface that connects the fuel cell stack 318 with a battery of the EV, such that the battery of the EV can be charged. In an embodiment, the EV can be equipped with an electrical plug (or socket) configured to couple with the electrical socket (or plug). The vehicle interface 316 may also be in the form of one or more battery clamps configured to be connected to one or more charging terminals of the EV. In one embodiment, vehicle interface 316 can be a standard or custom electrical socket (or plug) that complies with the Society of Automotive Engineers (SAE) standards such SAE J1772, SAE J3068, SAE J3105 etc., and/or complies with the International Electrotechnical Commission (IEC) standards such as IEC 62196-1, IEC 61851-1, IEC 62196-2, IEC 62196-3, etc.

Figure 4:
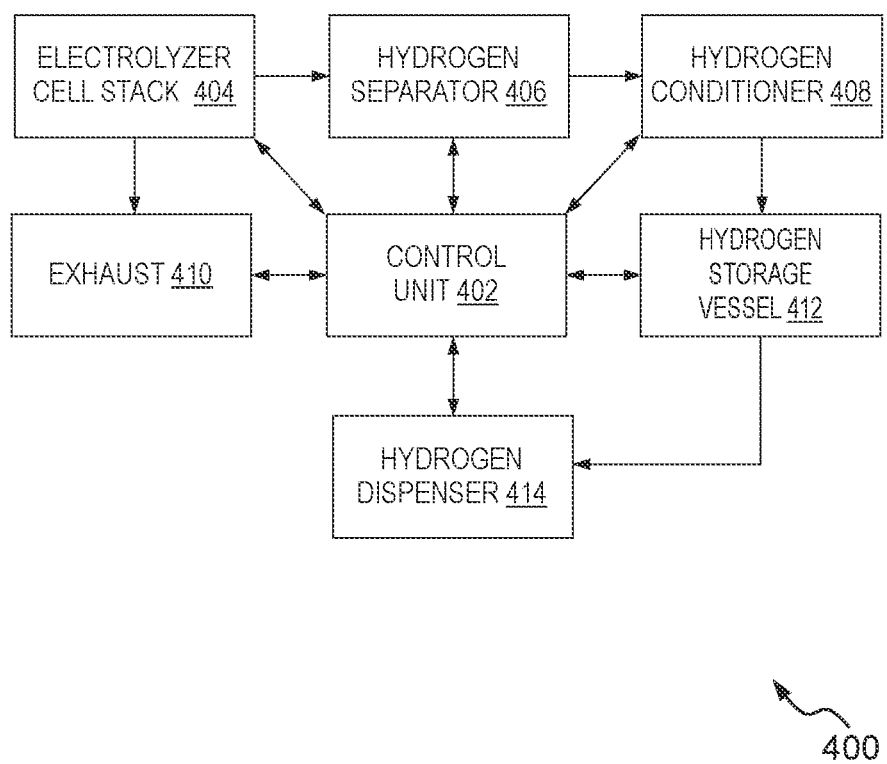
FIG. 4 is a block diagram of a solid oxide electrolyzer cell (SOEC) system in accordance with an embodiment of the present disclosure.

FIG. 4 is a block diagram of solid oxide electrolyzer cell (SOEC) system 400, in accordance with an embodiment of the present disclosure. The SOEC system 400 is similar to the SOEC system 207 described with references to FIGS. 2A-2C.

The SOEC system 400 may include an electrolyzer cell stack 404, a hydrogen separator 406, a hydrogen conditioner 408, a control unit 402, a hydrogen storage vessel 412, and a hydrogen dispenser 414. The SOEC system 400 shown in FIG. 4 is for representative purposes only, it may include more or fewer components than those depicted herein.

The control unit 402 may include a switch and a controller device such as a computer (not shown in FIG. 4) configured to control the components of the SOEC system 400. The switch may be an electrical switch (e.g., a switching circuit) or an electromechanical switch, such as a relay. The switch is configured to allow electricity from one of the electricity inputs (such as the electricity inputs 219a and 219b) or electricity from the SOFC system (such as the SOFC system 203). The controller device is configured to determine whether the switch should be connected to at least one of the electricity inputs or the electricity from the SOFC system. The controller device is further configured to determine that the switch should be connected to the electricity from the SOFC system upon determination of the absence of the electricity inputs. The controller device may allow the switch to connect to at least one of the electricity inputs upon their presence.

The electrolyzer cell stack 404 may include one or more electrolyzer cells configured to produce hydrogen from the electrolysis of water. The hydrogen separator 406 may include any device that separates hydrogen from a hydrogen-containing gas stream. The hydrogen conditioner 408 is a device configured to purify, dry, and compress the hydrogen from the hydrogen separator 406. The exhaust 410 is an outlet configured to allow oxygen to flow out of the electrolyzer cell stack 404. The hydrogen storage vessel 412 is configured to store the hydrogen. The hydrogen storage vessel 412 is similar to the hydrogen storage vessel 217 shown in FIGS. 2A-2C. The hydrogen dispenser 414 is a hydrogen pump that provides hydrogen to a hydrogen fuel cell vehicle, such as the HFCV 215 in FIGS. 2A-2C. The hydrogen dispenser 414 is a standard or custom hydrogen fuel dispenser that complies with Society of Automotive Engineers (SAE) standards such as SAE-TIR-J-2600, SAE-TIR-J-2601, SAE-TIR-J-2719, and SAE-TIR-J-2799, etc.

Various embodiments of the present disclosure facilitate zero-carbon energy stations that provide electricity for charging an EV and to refuel a hydrogen fuel cell vehicle from the on-site produced hydrogen. The embodiments herein provide a flexible energy charging system with different input and output configurations. The embodiments facilitate a charger for the EV that does not depend on the external grid and is always available irrespective of electricity from the external grid. In the embodiments, hydrogen is produced on-site at any remote MIMO charging system thereby precluding a need for transporting the hydrogen from a different place. The embodiments herein facilitate a DC charger that does not need voltage conversion from AC to DC.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A multi-input multi-output charging system, comprising:
    a solid oxide fuel cell (SOFC) system configured to generate electricity from one or more fuel inputs, the one or more fuel inputs including at least one renewable fuel, the SOFC system comprising:
        a DC/DC converter configured to produce DC power for different power ratings for charging batteries of different Electric Vehicles (EVs),
        a vehicle interface configured to connect a fuel stack of the SOFC system to the batteries of the EVs, through the DC/DC converter,
        a waste heat unit configured to heat the batteries of the EVs while charging,
        a cooling unit configured to cool the batteries of the EVs while charging, and
        a transactional unit comprising a processor, a memory, and a user interface configured to control the waste heat unit and the cooling unit;
    a solid oxide electrolyzer cell (SOEC) system coupled to the SOFC system, the SOEC system configured to generate hydrogen from the electricity received from the SOFC system and water input, the SOEC system comprising a hydrogen dispenser configured to provide hydrogen to a Hydrogen Fuel Cell Vehicle (HFCV),
    wherein the SOFC system is further configured to facilitate at least one of:
        charging of an electric vehicle;
        storing charge in a battery; and
        providing electric power to a load from the generated electricity, and
    wherein the SOEC system is further configured to facilitate at least one of:
        refueling an HFCV from the generated hydrogen; and
        storing the generated hydrogen in a hydrogen storage vessel.

2. The charging system of claim 1, wherein the SOFC system is further configured to receive the generated hydrogen from the SOEC system as a fuel input.

3. The charging system of claim 2, wherein the SOFC system comprises a control unit configured to select at least one fuel input of: the one or more fuel inputs; and the generated hydrogen.

4. The charging system of claim 3, wherein the control unit is configured to facilitate blending of the one or more fuel inputs for generating the electricity.

5. The charging system of claim 3, wherein the control unit is configured to facilitate blending of the one or more fuel inputs and the generated hydrogen for generating the electricity.

6. The charging system of claim 1, wherein the SOEC system is configured to receive electricity from an external grid, and wherein the external grid is connected to one or more power sources.

7. The charging system of claim 6, wherein the SOEC system is further configured to generate the hydrogen from the electricity provided by the external grid.

8. The charging system of claim 6, wherein the SOEC system comprises a control unit configured to select the electricity from the external grid and the electricity received from the SOFC system for generating the hydrogen.

9. The charging system of claim 6, wherein the one or more power sources comprise a solar power source, a wind power source, a nuclear power source, a fossil fuel power source, and a hydropower source.

10. The charging system of claim 1, wherein the one or more fuel inputs comprise liquefied natural gas (LNG).

11. The charging system of claim 1, wherein the one or more fuel inputs comprise bio-methane.

12. The charging system of claim 1, wherein the one or more fuel inputs comprise biogas.

* * * * *